United States Patent

Welczer

[11] 4,076,463
[45] Feb. 28, 1978

[54] WAVE MOTOR

[76] Inventor: Mordechai Welczer, Busthnai 4, Ramat Hasharon, Israel

[21] Appl. No.: 735,316

[22] Filed: Oct. 26, 1976

[51] Int. Cl.² .................. F04B 35/00; F03G 7/00
[52] U.S. Cl. ........................ 417/331; 60/497; 60/499
[58] Field of Search ............... 60/497–507; 417/330, 331, 332, 337; 290/53

[56] References Cited

U.S. PATENT DOCUMENTS

| | | | |
|---|---|---|---|
| 3,126,830 | 3/1964 | Dilliner | 417/331 |
| 3,362,336 | 1/1968 | Kafka | 417/331 |
| 3,918,260 | 11/1975 | Mahneke | 60/504 |
| 3,970,415 | 7/1976 | Widecrantz | 290/53 |

Primary Examiner—Allen M. Ostrager
Attorney, Agent, or Firm—Benjamin J. Barish

[57] ABSTRACT

A wave motor is described comprising a cylinder fixed to a first float, a plunger fixed to a second float, and an anchor secured to the cylinder normally retaining same submerged beneath the sea surface in a vertical position above the sea bottom but permitting it to move in a lateral direction with respect to the sea bottom. The second float is of sufficient volume to float on the surface of the sea, whereby wave crests and wave troughs cause the cylinder to move laterally and the plunger to rise and fall within the cylinder, thereby converting the wave energy to mechanical pumping energy.

10 Claims, 3 Drawing Figures

WAVE MOTOR

BACKGROUND OF THE INVENTION

The present invention relates to wave motors, and particularly to wave motors for converting energy from sea waves to mechanical energy.

The energy in the sea constitutes a vast reservoir which has remained largely untapped to the present time. Many types of wave motors have heretofore been proposed, but as a rule they have not been economically feasible because of the large initial costs involved in their constructing and installation compared to the amount of energy they are capable of extracting from the sea.

SUMMARY OF THE PRESENT INVENTION

An object of the present invention is to provide a wave motor of relatively simple design.

According to a broad aspect of the present invention, there is provided a wave motor comprising two members displaceable with respect to each other, a first float secured to one of the members for floating it above sea bottom, an anchor coupled to the first member for retaining it submerged in a normal vertical position beneath the sea surface above the sea bottom but permitting it to move in a lateral direction with respect to the sea bottom, and a second float secured to the second member, the second float being of sufficient volume to float on the surface on the sea. In such an arrangement, the wave crests cause the two members to move laterally of the sea bottom, and the second member to rise with respect to the first member; whereas was troughs permit the second member to descend with respect to the first member and also permit the first member to be returned to its normal (upright) position by the first float. Thus, relative displacement is effected between the first and second members, which relative displacement represents mechanical energy that can be exploited in many different ways.

In the preferred embodiments of the invention described below, this mechanical energy is exploited to pump a fluid, such as sea water. Thus, one of the members is a cylinder, and the other includes a plunger defining an expansible and contractable chamber with the cylinder. The wave motor further includes valve means inletting a fluid into the chamber upon its expansion, and outletting pressurized fluid from the chamber upon its contraction.

In one embodiment of the invention described below, the device functions as a single-acting pump; and in a second described embodiment, it functions as a double-acting pump.

Further features and advantages of the invention will be apparent from the description below.

BRIEF DESCRIPTION OF THE DRAWINGS

The invention is herein described, by way of example only, with respect to the accompanying drawings, wherein.

DESCRIPTION OF THE PREFERRED EMBODIMENTS

Figure 1:
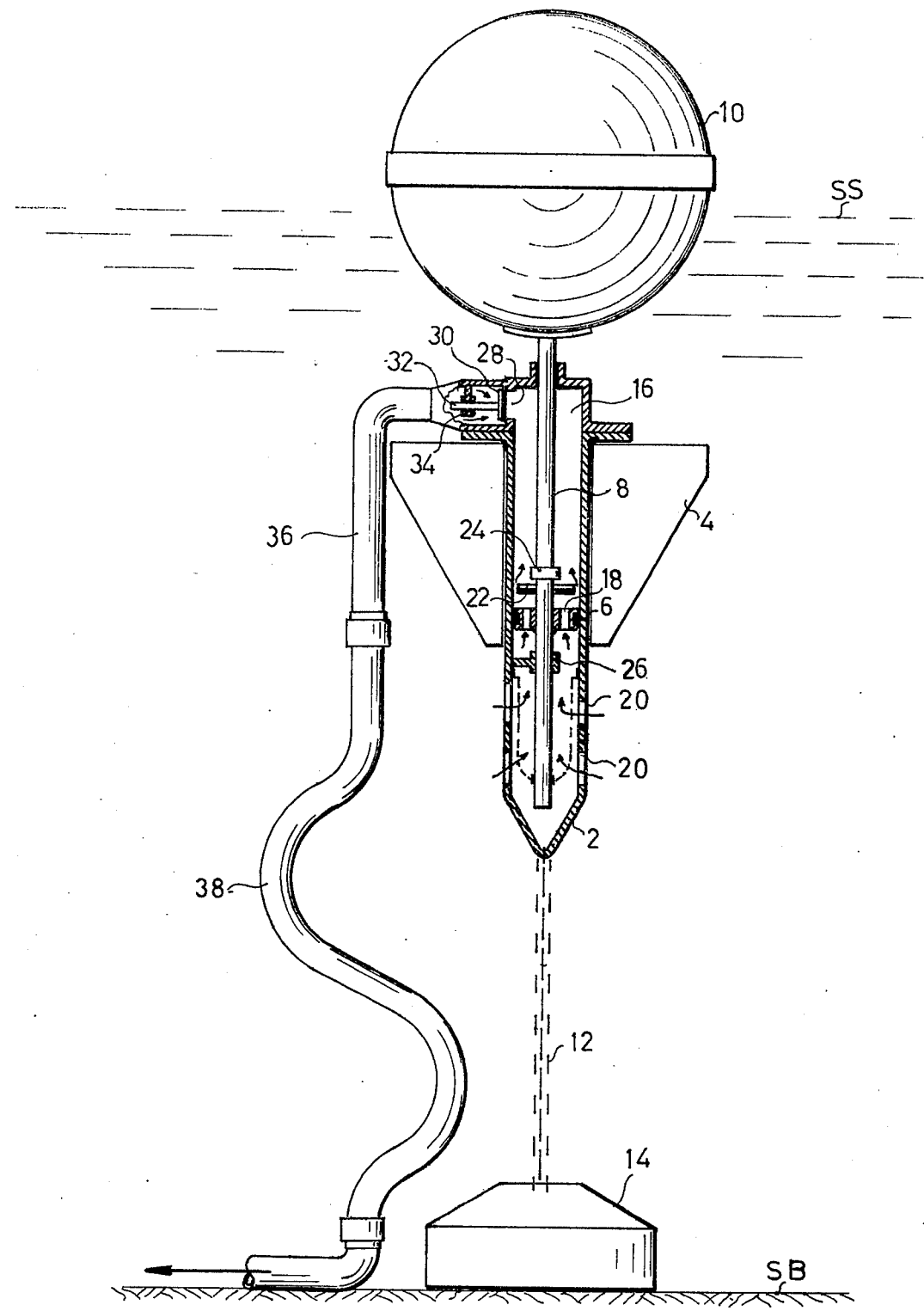
FIG. 1 is a diagrammatic view illustrating one form of wave motor constructed in accordance with the invention.
Figure 2:
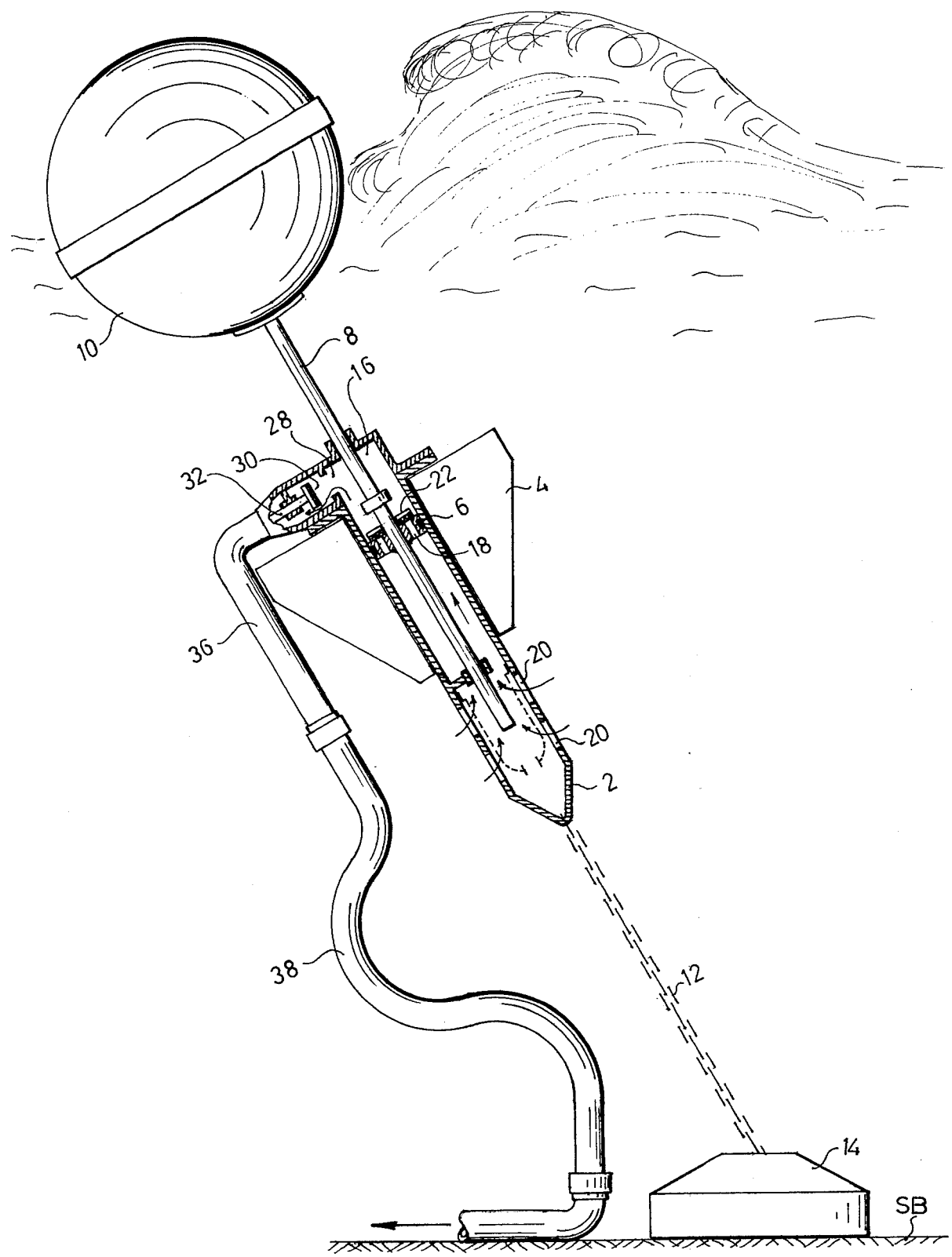
FIG. 2 illustrates the wave motor of FIG. 1 when subjected to a wave crest.

The wave motor illustrated in FIGS. 1 and 2 comprises a first member in the form of a cylinder 2 secured to a first float 4, and a second member in the form of a plunger head 6 movable within cylinder 2 and a stem 8 secured to a second float 10. Cylinder 2 is tied by a chain 12 to an anchor 14 such that the cylinder, as well as its float 4, is submerged between the sea surface SS above the sea bottom SB, but is permitted to move in a lateral direction with respect to the sea bottom, as shown in FIG. 2. Float 10, however, is of sufficient volume so as to float on the surface of the sea SS as shown in FIGS. 1 and 2.

Cylinder 2 and plunger head 6 thus define an expansible and contractable chamber 16, the chamber being contracted when float 10 causes the plunger head 6 to rise, and being expanded when the float drops by its own weight to lower the plunger head.

Plunger head 6 is formed with a plurality of passageways 18 which, together with openings 20 formed in cylinder 2 below an annular guide 26 for the plunger stem 8, constitute the inlet into chamber 16. Passageways 18 are adapted to be closed by an annular suction valve member 22 during the movement of the plunger head upwardly to contract the chamber, valve member 22 being freely carried on stem 8 between the plunger head 6 and a stop 24 fixed to the stem. It will be seen that when plunger head 6 moves upwardly to contract chamber 16, annular valve member 22 is forced against the upper face of plunger head 6 thereby closing passageways 18; whereas when plunger head is moved downwardly to expand chamber 16, valve member 22 is forced away from the upper face of the plunger head thereby opening passageways 18.

The opposite end of chamber 16 is provided with an outlet opening 28 closable by a delivery valve 30 having a stem 32 movable within a guide 34. The arrangement is such that when plunger head 6 is moved upwardly to contract chamber 16, the pressurized fluid within the chamber forces valve 30 away from the outlet opening 28, thereby permitting the pressurized fluid to flow out of the chamber; whereas when the plunger head 6 moves downwardly to expand chamber 16, valve member 30 is forced against outlet opening 28 thereby closing the outlet end of the chamber.

The pressurized fluid forced through the outlet end 28 of chamber 16 passes through a conduit 36, having a flexible section 38, to a utilisation device, such as an electrical generator or hydraulic motor, or to a storage device such as a water reservoir whose head is increased by the output of the wave motor.

The operation of the wave motor illustrated in FIGS. 1 and 2 will be apparent from the above description. Thus, during still conditions, the parts will be as shown in FIG. 1, wherein cylinder 2 is held by float 4 and anchor 14 in a substantially vertical position above the the sea bottom SB and below the sea surface SS, with float 10 floating on top of the sea surface SS. When wave crests are experienced, float 10 rises as shown in FIG. 2, and raises plunger head 6 within cylinder 2, thereby causing chamber 16 to contract and to deliver pressurized sea water through outlet opening 28 via the opened delivery valve 30 into conduit 36. This displacement of float 10 and plunger head 6 by a wave crest also causes cylinder 2 to move laterally with respect to the sea bottom SB, which lateral movement further increases the relative displacement of plunger head 6 with respect to the cylinder.

Now, as float 10 experiences a wave trough, it descends under its own weight, thereby lowering plunger head 6 within cylinder 2 and permitting cylinder 2 to be returned to an upright position by its float 4, thereby expanding chamber 16. This expansion of the chamber causes delivery valve member 30 to seat against the outlet opening 28, and also causes the suction valve member 22 to move away from passageways 18 in the plunger head 6, thereby permitting the water to enter chamber 16 via openings 20 at the lower end of cylinder 2 and passageways 18 in the plunger head.

Figure 3:
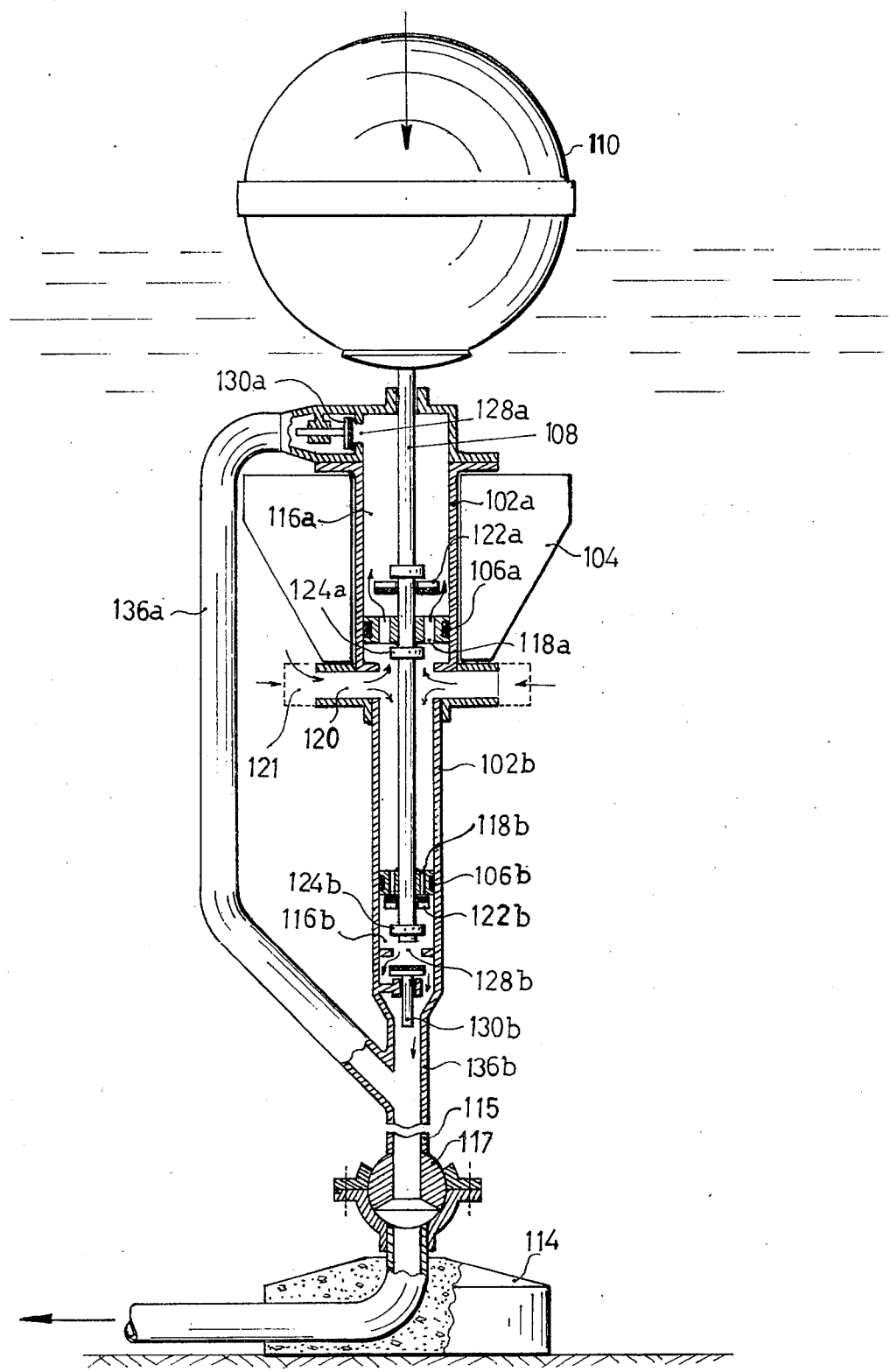
FIG. 3 illustrates another form of wave motor constructed in accordance with the invention.

It will be seen that the wave motor of FIGS. 1 and 2 functions as a single-acting pump, pumping the sea water into conduit 36 only during the upward stroke of the plunger. FIG. 3 illustrates an arrangement functioning as a double-acting pump, wherein water is pumped into the conduit both during the upward stroke of the plunger and also during the downward stroke of the plunger.

Thus, as shown in FIG. 3, the cylinder 102 secured to float 104 includes a pair of plunger heads 106a, 106b both carried by a common stem 108 fixed to float 110. The two plunger heads thus define two expansible and contractable chambers, namely chamber 116a at the upper end of the cylinder, and chamber 116b at the lower end of the cylinder. The inlets to these two chambers includes passageways 118a, 118b in the two plunger heads, and a common inlet 120 to the cylinder between the two chambers 116a, 116b. Common inlet 120 is provided with filter screens, as shown as 121, to filter the water entering the pump chambers.

In the embodiment of FIG. 3, cylinder 102 is secured to anchor 114 by a conduit 115 and a universal joint 117 which retain the cylinder submerged below the sea surface and also permit it to be moved laterally with respect to the sea bottom. In addition, cylinder 102 is made of two different-diameter sections, namely an upper, larger-diameter section 102a, and a lower, smaller-diameter section 102b. The diameters of the two plunger heads 106a, 106b are such as to be snugly received within their respective cylinder sections 102a, 102b.

Each of the plunger heads 106a, 106b includes an annular suction valve member 122a, 122b adapted to close the passageway 118a, 118b, of its plunger head when the latter is moving to contract the respective chamber, and to open the passageway when its plunger head is moving in the reverse direction to expand the chamber. Each of the annular valve members 122a, 122b limits against a ring 124a, 124b secured to the common plunger stem 108. The outlet ends 128a, 128b of the two chambers are similarly closed by one-way delivery valves 130a, 130b when the respective chamber is expanded, and are opened when the chamber is contracted to permit the outletting of the pressurized fluid from the respective chamber. The pressurized fluid from chamber 116a is delivered to conduit 136a, and that from chamber 116b is delivered to conduit 136b, both conduits joining together to the common outlet pipe 115 conducting the water through the universal joint 117 and anchor 114 to a utilisation or storage device as described above with respect to FIGS. 1 and 2.

The operation of the wave motor illustrated in FIG. 3 will be apparent from the above description. Thus, when float 110 experiences a wave crest, it raises plunger stem 108, and at the same time moves cylinder 102 to an inclined position (as illustrated in FIG. 2), this being permitted by the universal joint 117. As plunger head 122a is moved upwardly by stem 108 within the cylinder, it contracts its chamber 116a, thereby delivering pressurized fluid through outlet 128a and opened valve 130a to conduit 136a. At the same time, stem 108 moves plunger head 106b upwardly to expand its chamber 116b, whereby water is introduced via inlet 120 and passageway 118b (opened by the suction valve member 122b) into chamber 116b.

Now, when float 110 experiences a wave trough, its lowers stem 108 by its own weight, thereby moving plunger head 106a downwardly, causing its chamber 116a to expand and to receive water via inlet 120 and passageway 118a (opened by suction valve member 122a); at the same time, plunger head 106b moves downwardly to contract its chamber 116b (its passageway 118b being closed by suction valve member 122b), thereby pumping the pressurized fluid through its outlet opening 128b into conduit 136b.

It will thus be seen that the arrangement illustrated in FIG. 3 functions as a double-acting pump, pumping the water both during wave crests and wave troughs. Since the pumping stroke during wave troughs is effected by the weight of the elements, particularly of float 110, it is desirable to have the chamber (116b) being contracted during this stroke to be of smaller diameter than the chamber (116a) contracted during the wave crest strokes, so as to decrease the weight of float 110 that would be required to effect that stroke.

Many other variations, modifications and applications of the invention will be apparent.

What is claimed is:

1. A wave motor for converting energy from sea waves to mechanical energy, comprising: a first member, a second member displaceable with respect to the first member; a first float secured to said first member for floating same above the sea bottom; an anchor; coupling means coupling said anchor to said first member for normally retaining same submerged beneath the sea surface in a vertical position above the sea bottom but permitting same to move in a lateral direction with respect to the sea bottom; and a second float secured to said second member, said second float being of sufficient volume to float on the surface of the sea; whereby wave crests cause said first and second members to move laterally of the sea bottom and said second member to rise with respect to said first member, whereas wave troughs permit said first member to return to its normal vertical position and said second member to descend with respect to said first member, thereby producing mechanical energy by the relative displacement between said first and second members.

2. A wave motor according to claim 1, wherein one of said members comprises a cylinder, and the other of said members comprises plunger means movable therein and defining an expansible and contractable chamber therewith; said chamber further including valve means inletting a fluid into the chamber upon the expansion thereof and outletting pressurized fluid from the chamber upon the contraction thereof.

3. A wave motor according to claim 2, wherein said first float is secured to said cylinder, and said second float is secured to said plunger means.

4. A wave motor according to claim 1, wherein said coupling means coupling said anchor to said first member comprises a chain.

5. A wave motor according to claim 1, wherein said coupling means coupling said anchor to said first member comprises a universal joint.

6. A wave motor according to claim 3, wherein said valve means are arranged to cause said cylinder and plunger means to act as a single-acting pump, and comprise a suction valve at the inlet to said chamber and opened upon the expansion thereof to permit the suction of fluid therein, and a delivery valve at the outlet of said chamber and opened upon the contraction thereof to permit the outletting of pressurized fluid therefrom.

7. A wave motor according to claim 6, wherein said plunger means includes a stem connected to said second float, and a head formed with a passageway constituting the inlet of the chamber; and wherein said suction valve comprises a valve member movable on said stem to open said passageway upon the movement of the plunger to expand said chamber, and to close said passageway upon movement of the plunger in the opposite direction to contract said chamber.

8. A wave motor according to claim 3, wherein said valve means are arranged to cause said cylinder and plunger means to act as a double-acting pump, there being a pair of plunger heads carried at opposite ends of a common stem fixed to said second float and defining an expansible and contractable chamber at each end of said cylinder; said cylinder having an inlet between said chambers; each of said plunger heads including a passageway constituting the inlet to the respective chamber; each of said chambers including a suction valve member movable on the stem to open the passageway of its plunger head upon the movement of the latter to expand its respective chamber, and to close the passageway of its plunger head upon the movement of the latter to contract its respective chamber; each of said chambers further including a delivery valve member at the outlet end thereof opened upon the movement of the respective plunger head to contract the chamber to permit the outletting of pressurized fluid therefrom.

9. A wave motor according to claim 8, wherein the chamber contracted during the wave troughs is of smaller diameter than that contracted during the wave crests.

10. A wave motor according to claim 3, wherein said cylinder includes an inlet opening for inletting sea water, and an outlet conduit for outletting sea water pressurized by the relative displacement of said plunger means and cylinder.

* * * * *